United States Patent
Albrecht et al.

(10) Patent No.: US 11,218,383 B2
(45) Date of Patent: Jan. 4, 2022

(54) SIMULATION SYSTEM AND METHOD FOR SIMULATING PROCESSING OF RESERVATION ENQUIRIES FOR MULTICAST DATA STREAMS IN COMMUNICATIONS NETWORKS

(71) Applicant: Siemens Aktiengesellschaft, Munich (DE)

(72) Inventors: Harald Albrecht, Nuremberg (DE); Stephan Höme, Schwabach (DE); Sven Kerschbaum, Fürth (DE); Marcel Kießling, Velden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/271,528

(22) PCT Filed: Jul. 29, 2019

(86) PCT No.: PCT/EP2019/070297
§ 371 (c)(1),
(2) Date: Feb. 25, 2021

(87) PCT Pub. No.: WO2020/043408
PCT Pub. Date: Mar. 5, 2020

(65) Prior Publication Data
US 2021/0320851 A1      Oct. 14, 2021

(30) Foreign Application Priority Data
Aug. 31, 2018 (EP) .................................... 18191982

(51) Int. Cl.
*G06F 15/173* (2006.01)
*H04L 12/24* (2006.01)
(Continued)

(52) U.S. Cl.
CPC ...... *H04L 41/5038* (2013.01); *G06F 9/45558* (2013.01); *H04L 41/12* (2013.01); *H04L 45/745* (2013.01); *G06F 2009/45595* (2013.01)

(58) Field of Classification Search
CPC ... H04L 41/5038; H04L 45/745; H04L 41/12; G06F 9/45558; G06F 2009/45595
See application file for complete search history.

(56) References Cited

U.S. PATENT DOCUMENTS

| | | |
|---|---|---|
| 10,298,380 B2 | 5/2019 | Kiessling |
| 2009/0070468 A1 | 3/2009 | Ohta |

(Continued)

FOREIGN PATENT DOCUMENTS

| | | |
|---|---|---|
| CN | 101356781 | 1/2009 |
| CN | 101895931 | 11/2010 |

(Continued)

OTHER PUBLICATIONS

PCT Search Report dated Sep. 30, 2019 based on PCT/EP2019/070297 filed Jul. 29, 2019.

(Continued)

*Primary Examiner* — John B Walsh
(74) *Attorney, Agent, or Firm* — Cozen O'Connor

(57) ABSTRACT

Simulation system and method for simulating processing of reservation enquiries for multicast data streams in communications networks, wherein communication devices which are to be simulated with regard to their behaviour are functionally divided into a communication control plane designated as a control plane and into a data transmission plane designated as a data plane, where simulation system components formed by software containers which are executable in a sequence control environment are case provided for functions of the communication devices associated with the control plane, network infrastructure devices (Continued)

are modelled on the data plane by resources provided via each of the network infrastructure devices, and where the software containers associated with the communication devices are selectively executed in the sequence control environment and coupled together there according to a predetermined topology.

19 Claims, 2 Drawing Sheets

(51) Int. Cl.
    *G06F 9/455*     (2018.01)
    *H04L 12/741*     (2013.01)

(56) References Cited

U.S. PATENT DOCUMENTS

| | | |
|---|---|---|
| 2013/0138800 A1 | 5/2013 | Getter et al. |
| 2016/0014039 A1* | 1/2016 | Reddy ............... G06F 8/61 709/224 |
| 2016/0182394 A1 | 6/2016 | Kiessling |
| 2019/0327181 A1 | 10/2019 | Dilger et al. |

FOREIGN PATENT DOCUMENTS

| | | |
|---|---|---|
| CN | 105721335 | 6/2016 |
| DE | 10138363 | 2/2003 |
| EP | 3038325 | 6/2016 |
| WO | WO 2018/121864 | 7/2018 |
| WO | WO 2018/141357 | 8/2018 |

OTHER PUBLICATIONS

Jeong-Hyun Cho et al. "A Bandwidth Reservation Method for Multicast Streaming Service", Convergence and HYB RID Information Technology, Springer Berlin Heidelberg, Berlin, Heidelberg, pp. 17-24, 2012.

Office Action dated Jun. 30, 2021 issued in Chinese Patent Application No. 201980056676.3.

* cited by examiner

SIMULATION SYSTEM AND METHOD FOR SIMULATING PROCESSING OF RESERVATION ENQUIRIES FOR MULTICAST DATA STREAMS IN COMMUNICATIONS NETWORKS

CROSS-REFERENCE TO RELATED APPLICATIONS

This is a U.S. national stage of application No. PCT/EP2019/070297 filed 29 Jul. 2019. Priority is claimed on European Application No. 18191982.0 filed 31 Aug. 2018, the content of which is incorporated herein by reference in its entirety.

BACKGROUND OF THE INVENTION

1. Field of the Invention

The invention relates to industrial automation systems and, more particularly to a simulation system and method for simulating processing of reservation enquiries for multicast data streams in communications networks.

2. Description of the Related Art

An industrial automation system normally comprises a multiplicity of automation devices networked with one another via an industrial communications network and, in production automation or process automation, serves to control or regulate plants, machines or devices. Due to time-critical boundary conditions in industrial automation systems, real-time communications protocols, such as PROFINET, PROFIBUS, Real-Time Ethernet or Time-Sensitive Networking (TSN), are predominantly used for communication between automation devices.

Interruptions in communications connections between computer units of an industrial automation system or automation devices can result in an unwanted or unnecessary repetition of the transmission of a service request. Furthermore, messages that are not or are not completely transmitted may, for example, prevent a transition or continuation of an industrial automation system to or in a safe operational state. This can ultimately result in failure of an entire production plant and a costly production shutdown. A particular problem regularly arises in industrial automation systems from message traffic with proportionally numerous, but relatively short, messages, as a result of which the above problems are exacerbated.

Due to a use for often widely differing applications, problems can arise, for example, in the Ethernet-based communications networks if network resources are used in contention for a transmission of multicast data streams or data frames with real-time requirements without specific quality of service requirements. This may result in a transmission of multicast data streams of data frames with real-time requirements that does not meet a requested or required quality of service.

A prioritized transmission of data frames is essentially possible, for example, via corresponding tags inserted into data frames based on Virtual Local Area Networks (VLANs) in accordance with the Institute of Electrical and Electronics Engineers (IEEE) 802.1Q standard. For synchronized and prioritized transmission of audio and video data streams (audio/video bridging) via communications networks, a bandwidth reservation is provided in accordance with the IEEE 802.1Qav standard for individual communications connections to which the highest priority is assigned. Resources required for a transmission of audio and video data streams are reserved in communications devices such as switches. However, high-priority data frames are forwarded only following a successful reservation. Bandwidth monitoring ensures that, with respect to actually used bandwidth, sufficient reserved bandwidth is available. A communications connection that uses more bandwidth than is reserved would otherwise result in disruption of an entire communications network and, in the worst case, in its shutdown due to overload.

For the secured transmission of audio and video data streams via Ethernet-based communications networks, Credit-Based Shapers (CBS) have been defined in accordance with the IEEE 802.1Qbv standard as a measure for bandwidth monitoring. With Credit-Based Shapers, a transmission pause is defined following each transmitted data frame to ensure a bandwidth limitation in relation to a reserved bandwidth. However, compulsory pauses of this type are extremely problematic in industrial automation systems in the event of a transmission of numerous data frames with small payload content for control data which tend to be regarded as data bundles or bursts.

DE 10 138 363 A1 discloses a method for guaranteeing the quality of service of Internet applications in which Internet applications are automatically adapted and optimized, utilizing the resources of the IP access network and the end system that are available at the Internet application start time. The Quality of Service (QoS) communications requirements with respect to IP access network are captured from Internet applications and stored as application profiles. When an Internet application is activated, the currently available network resources of the IP access network are compared with the stored application profiles and control data are determined. The provision of the network resources for the Internet application concerned is optimized based on the determined control data. The optimization relates to an adapted temporal sequence and the determination of the configuration that is most favorable in terms of costs (transmission costs).

According to EP 3 038 325 A1, for data transmission in a communications network of an industrial automation system, first data frames comprising control data for the automation system are transmitted by coupling communications devices of the communications network only within periodic first-time intervals. Second time frames that are assigned to data streams comprising sequences of data frames, or third data frames, for the transmission of which no quality of service or a quality of service below a predefined threshold value is specified, are transmitted within periodic second time intervals. The first-time intervals are subdivided into a first and second sub-interval. First data frames to be forwarded are inserted in alternating sub-intervals into a first or second queue and are removed alternately from the queues for forwarding.

In accordance with IEEE 802.1Qcc (Stream Reservation Protocol (SRP) Enhancements and Performance Improvements), it is provided, in particular for Time-Sensitive Networking, that terminal stations, such as automation devices, in communications networks can reserve resources necessary for the transmission of multicast data streams with desired quality of service parameters via reservation enquiries. Reservation enquiries are fulfilled or rejected depending on resources available in the communications network. Calculations required for decisions relating to reservation enquiries are performed based on either a local or central configuration model. In the local configuration model, bridges or switches each determine for themselves those resources which are already used elsewhere and those that are still available, and inform the respective terminal station accordingly whether its reservation enquiry can be fulfilled. The problem here is that the bridges or switches know only their own product-specific or hardware-specific parameters but, in particular, not those of competitor products. This problem arises in the central configuration model also, in which a central instance performs the necessary calculations.

In a planning of communications networks and industrial control applications that are to be implemented via these communications networks, the earliest possible verification is important to determine whether quality of service requirements that exist in relation to the control applications can be met via a given planning status. Corresponding verifications are important after a communications network has been set up or commissioned in order to also be able to assess the impacts of plant expansions in a timely manner.

SUMMARY OF THE INVENTION

In view of the foregoing, it is an object of the present invention to provide a simulation system and method for simulating processing of reservation enquiries for multicast data streams in communications networks that does not require an extensive disclosure of product-specific or hardware-specific parameters for network infrastructure devices which are to be analyzed in terms of their behavior.

This and other objects and advantages are achieved in accordance with the invention by a method and a simulation system in which for simulating processing of reservation enquiries for multicast data streams in communications networks, communications devices that are to be simulated with respect to their behavior are each functionally divided into a communications control plane, referred to as the control plane, and into a data transmission plane, referred to as the data plane. The communications devices are interconnected within a predefined topology and comprise communications terminal devices on start nodes and end nodes of paths for multicast data streams and network infrastructure devices, in particular routers, switches or bridges, on intermediate nodes. The communications terminal devices on the start nodes each specify quality of service parameters for the multicast data streams for the reservation of resources to be provided by the network infrastructure devices on the intermediate nodes. Conversely, the communications terminal devices on the end nodes each specify a multicast data stream identifier for a reservation enquiry. In the event of a reservation enquiry, the network infrastructure devices on the intermediate nodes or a higher-level control unit each verify or verifies whether sufficient resources for the data transmission are available in the network infrastructure devices along the respective path while adhering to the specified quality of service parameters. If sufficient resources are available, a multicast address assigned to the specified multicast data stream identifier is transmitted in each case to an enquiring communications terminal device on an end node so that the terminal device can access the multicast data stream.

The resources made available by the network infrastructure devices on the data plane comprise, for example, bandwidth, queue number, queue cache or address cache, of the respective network infrastructure device. Furthermore, the reservation enquiries are preferably handled in accordance with IEEE 802.1Qcc. A talker function can be assigned to each of the communications terminal devices on the start nodes, whereas a listener function can be assigned to each of the communications terminal devices on the end nodes.

Simulation system components that are formed by software containers executable in a sequence control environment are each provided in accordance with the invention for functions of the communications devices assigned to the control plane. The software containers are preferably based on control plane firmware of the communications devices. In addition, the network infrastructure devices are each modelled on the data plane in accordance with the invention by resources provided via the network infrastructure devices. The software containers assigned to the communications devices in accordance with the predefined topology are selectively executed in the sequence control environment and are coupled to one another there. The software containers for the communications terminal devices on the start nodes and end nodes are executed during the simulation according to specifications relating to a multicast data stream that is provided or requested in each case. The simulation is used to verify whether multicast data streams requested in accordance with reservation enquiries are provided while adhering to the specified quality of service parameters.

The present invention enables a precise preliminary validation, in particular of Time-Sensitive Networking (TSN) quality of service requirements without necessarily being reliant on exact device descriptions. Product-specific or hardware-specific parameters can be hidden in the software containers. If the software containers are based on the control plane firmware of the communications devices, then the simulated behavior corresponds to the actual behavior.

In accordance with one advantageous embodiment of the present invention, information relating to the communications devices interconnected within the predefined topology and to the predefined topology is acquired via a network device discovery or is retrieved from an engineering system. Information required for the simulation can be simply provided in this way. In addition, memory mappers for the software containers are preferably retrieved from a storage and provisioning system (container image repository) to which a multiplicity of users have read or write access. Required simulation system components assigned to the communications devices can thus be delivered in a simple and automatable manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in detail below based on the basis of an example embodiment and with reference to the drawing, in which.

DETAILED DESCRIPTION OF THE EXEMPLARY EMBODIMENTS

Figure 1:
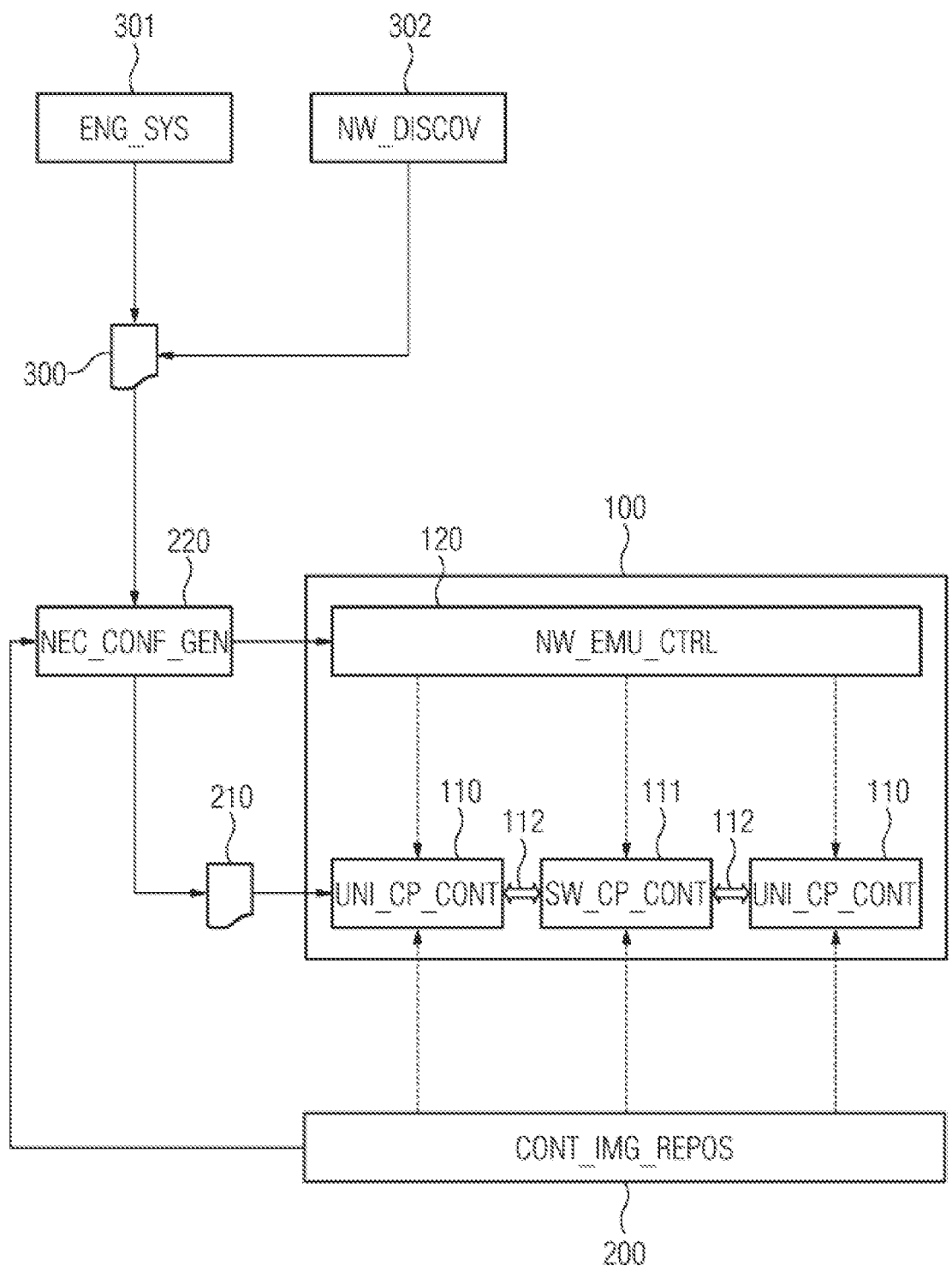
FIG. 1 shows a schematic view of a simulation system for simulating processing of reservation enquiries for multicast data streams in communications networks.

The simulation system shown in FIG. 1 comprises a configuration generator 220 for a controller 120 of a network emulator 100. The network emulator 100 provides a sequence control environment for simulation system components that are assigned to communications devices to be simulated with respect to their behavior. The communications devices are interconnected within a predefined topology and comprise communications terminal devices on start nodes and end nodes of paths for multicast data streams and network infrastructure devices on intermediate nodes.

The communications terminal devices on the start nodes and end nodes may, for example, be control units of an industrial automation system, in particular programmable logic controllers, or field devices, such as sensors or actuators for machines or devices controlled by the control units. The control units are preferably connected to the field devices via a communications network designed and configured as a Time-Sensitive Network (TSN) in accordance with IEEE 802.1Q and IEEE 802.1Qbv. The network infrastructure devices on the intermediate nodes comprise, in particular, routers, switches and bridges, and forward datagrams within the communications network.

The communications devices to be simulated with respect to their behavior are each functionally divided into a communications control plane, referred to as the control plane, and into a data transmission plane, referred to as the data plane. Simulation system components that are formed by software containers 110, 111, executable in the sequence control environment of the network emulator, are each provided for functions of the communications devices assigned to the control plane. This offers the advantage that a specification of normally confidentially treated details relating to functions or device components that are assigned to the control plane is not necessary, because these details can be hidden in the software containers 110, 111. Routing tables or forwarding tables, for example, can be predefined for the network infrastructure devices by means of functions assigned to the control plane.

The software containers 110, 111, are preferably based on conventional concepts for container virtualization that are geared towards a shared use of an operating system kernel by a host system and software running in containers, and also an isolation of selected operating system resources from one another. Control groups, for example, and namespacing are important aspects for this purpose. Process groups can be defined via control groups to restrict available resources for selected groups. Individual processes or control groups can be isolated or hidden from other processes or control groups via namespaces.

Conversely, on the data plane, the network infrastructure devices are modelled simply based on information relating to resources that are each provided by the network infrastructure devices. The resources provided by the network infrastructure devices on the data plane comprise, in particular, bandwidth, queue number, queue cache or address cache of the respective network infrastructure device.

In the present exemplary embodiment, the configuration generator 220 generates information required by the controller 120 of the network emulator 100 from a network device and network wiring diagram 300, said information relating to the software containers 110, 111 to be started and their wiring 112 on the network side, corresponding to the network device and network wiring diagram 300. On this basis, the software containers 110, 111 assigned to the communications devices in accordance with the predefined topology are selectively executed in the sequence control environment of the network emulator 100 and are coupled to one another there. Information relating to the communications devices interconnected within the predefined topology and to the predefined topology is preferably acquired via a network discovery tool 302 or are retrieved from an engineering system 301.

The network device and network wiring diagram 300 also comprises a description of reservation enquiries to be analyzed via simulation for multicast data streams and quality of service parameters. This information is present in the engineering system 301 or can be derived via the network discovery tool 302 from quality of service requirements recorded in a real network. The quality of service parameters, such as bandwidth and latency, are specified for the multicast data streams by the communications terminal devices on the start nodes for the reservation of resources to be provided by the network infrastructure devices on the intermediate nodes. Corresponding thereto, the communications terminal devices on the end nodes each specify a multicast data stream identifier for a reservation enquiry. The multicast data stream identifier has, in particular, bandwidth, latency and multicast address of the respective multicast data stream as assigned information.

In addition, the configuration generator 220 generates datasets 210 relating to desired reservations of multicast data streams and provides these, in particular, to the software containers 110 for the communications terminal devices. On this basis, the software containers 110 are executed for the communications terminal devices on the start nodes and end nodes during the simulation in accordance with specifications for a respectively provided or requested multicast data stream.

In the present exemplary embodiment, the reservation enquiries are treated in accordance with IEEE standard 802.1Qcc. A talker function is assigned in each case to the communications terminal devices on the start nodes, whereas a listener function is assigned in each case to the communications terminal devices on the end nodes. The network infrastructure devices on the intermediate nodes or a higher-control device verify or verifies whether sufficient resources for the data transmission are available in the network infrastructure devices along the respective path while adhering to the specified quality of service parameters.

During simulation of processing of reservation enquiries for virtual ingress ports and egress ports of the network infrastructure devices, it is possible to verify, for example, whether sufficient resources in terms of bandwidth, queue number, queue cache and address cache are available in the respective network infrastructure device. In particular, in the case of a reservation of resources for multicast data streams, it must essentially be ensured at least that the multicast address of the respective multicast data stream is recordable in the address cache. If the simulation reveals that sufficient resources are available in each case, a multicast address assigned to the specified multicast data stream identifier is transmitted to an enquiring communications terminal device on an end node.

As a result of the simulation, it is therefore verified whether multicast data streams requested in accordance with reservation enquiries are provided while adhering to the specified quality of service parameters. In accordance with the present exemplary embodiment, whether verified reservation enquiries are fulfillable is recorded during the simulation via the software containers 110 for the communications terminal devices on the end nodes.

The software containers 110, 110 are preferably based directly on control plane firmware of the communications devices and are provided via a container image repository 200. The container image repository 200 is a storage and provisioning system to which a multiplicity of users have read or write access and from which memory mappers for the software containers 110, 111 are retrievable for each firmware version.

Figure 2:
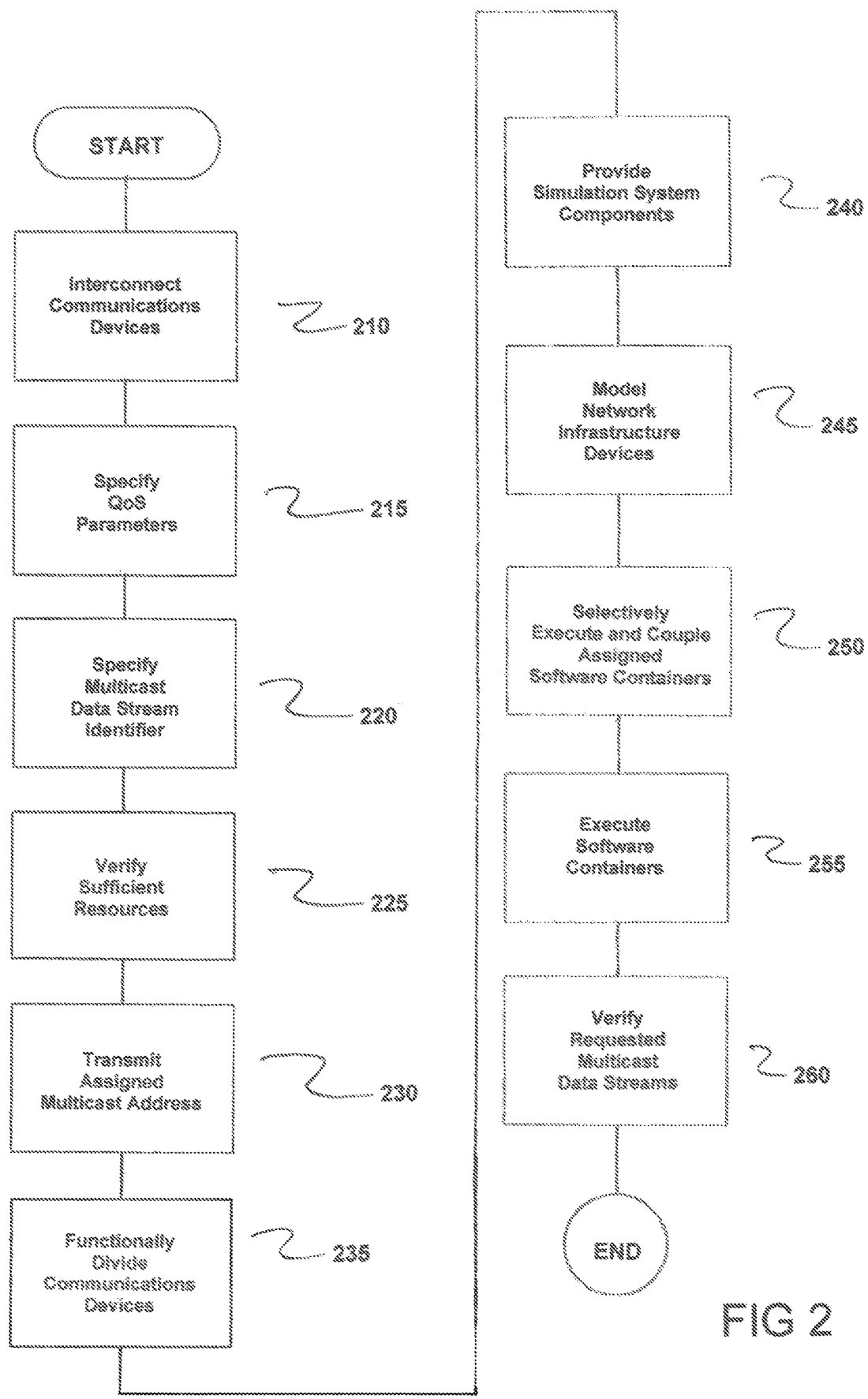
FIG. 2 is a flowchart chart in accordance with the invention.

FIG. 2 is a flowchart of the method for simulating processing of reservation enquiries for multicast data streams in communications networks. The method comprises interconnecting communications devices within a predefined topology, as indicated in step 210. In accordance with the invention, the communications devices comprise communications terminal devices on start nodes and/or end nodes of paths for multicast data streams and network infrastructure devices.

Next, each communications terminal device on the start node specifies quality of service parameters for the multicast data streams for the reservation of resources to be provided by the network infrastructure devices on intermediate nodes, as indicated in step 215.

Next, each of the communications terminal devices on the end nodes specify a multicast data stream identifier for a reservation enquiry, as indicated in step 220.

Next, in an event of a reservation enquiry, each of the network infrastructure devices on the intermediate nodes and/or a higher-level control unit verify whether sufficient resources for the data transmission are available in the network infrastructure devices along the respective path while adhering to the specified quality of service parameters, as indicated in step 225.

Next, a multicast address assigned to the specified multicast data stream identifier is transmitted to each enquiring communications terminal device on an end node if sufficient resources are available, as indicated in step 230.

Next, each of the communications devices to be simulated is functionally divided, based on their behavior, into a communications control plane comprising a control plane, and into a data transmission plane comprising a data plane, as indicated in step 235.

Next, simulation system components which are formed by software containers executable in a sequence control environment are provided for functions of each of the communications devices assigned to the control plane, as indicated in step 240.

Next, each of the network infrastructure devices on the data plane are modelled by resources provided via the network infrastructure devices, as indicated in step 245.

Next, the software containers assigned to the communications devices in the sequence control environment are selectively executed and coupling to one another in accordance with the predefined topology, as indicated in step 250.

Next, the software containers for the communications terminal devices are executed on the start nodes and/or end nodes during the simulation in accordance with specifications relating to a multicast data stream which is at least one of provided and requested in each case, as indicated in step 255.

Next, whether multicast data streams requested in accordance with reservation enquiries are provided while adhering to the specified quality of service parameters is verified via the simulation, as indicated in step 260.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for simulating processing of reservation enquiries for multicast data streams in communications networks, the method comprising:
   interconnecting communications devices within a predefined topology, said communications devices comprising communications terminal devices on at least one of (i) start nodes and (ii) end nodes of paths for multicast data streams and network infrastructure devices;
   specifying, by each communications terminal device on the start node, quality of service parameters for the multicast data streams for the reservation of resources to be provided by the network infrastructure devices on intermediate nodes;
   specifying, by each of the communications terminal devices on the end nodes, a multicast data stream identifier for a reservation enquiry;
   verifying, by each of the network infrastructure devices on at least one of (i) the intermediate nodes and (ii) a higher-level control unit, in an event of a reservation enquiry, whether sufficient resources for the data transmission are available in the network infrastructure devices along the respective path while adhering to the specified quality of service parameters;
   transmitting a multicast address assigned to the specified multicast data stream identifier to each enquiring communications terminal device on an end node if sufficient resources are available;
   functionally dividing each of the communications devices to be simulated based on behavior into a communications control plane comprising a control plane, and into a data transmission plane comprising a data plane;
   providing simulation system components which are formed by software containers executable in a sequence control environment for functions of each of the communications devices assigned to the control plane;
   modelling each of the network infrastructure devices on the data plane by resources provided via the network infrastructure devices;
   selectively executing the software containers assigned to the communications devices in the sequence control environment and coupling said executed software containers to one another in accordance with the predefined topology;
   executing the software containers for the communications terminal devices on at least one of (i) the start nodes and (ii) the end nodes during the simulation in accordance with specifications relating to a multicast data stream which is at least one of provided and requested in each case; and verifying, via the simulation, whether multicast data streams requested in accordance with reservation enquiries are provided while adhering to the specified quality of service parameters.

2. The method as claimed in claim 1, the method further comprising one of (i) acquiring which information relating to the communications devices interconnected within the predefined topology and to the predefined topology via a network device discovery and retrieving the information relating to the communications devices interconnected within the predefined topology and to the predefined topology via a network device discovery from an engineering system.

3. The method as claimed in claim 1, wherein datagrams are forwarded within the communications network by the network infrastructure devices.

4. The method as claimed in claim 2, wherein datagrams are forwarded within the communications network by the network infrastructure devices.

5. The method as claimed in claim 3, wherein the network infrastructure devices comprise routers and switches; and wherein at least one of (i) routing tables and (ii) forwarding tables are predefined for the network infrastructure devices via functions assigned to the control plane.

6. The method as claimed in claim 1, wherein the resources provided by the network infrastructure devices on the data plane comprise at least one of (i) bandwidth, (ii) queue number, (iii) queue cache and (iv) an address cache of the respective network infrastructure device.

7. The method as claimed in claim 1, wherein the reservation enquiries are handled in accordance with Institute of Electrical and Electronics Engineers (IEEE) standard 802.1Qcc.

8. The method as claimed in claim 7, wherein a talker function is assigned to each of the communications terminal devices on the start nodes; and wherein a listener function is assigned to each of the communications terminal devices on the end nodes.

9. The method as claimed in claim 1, wherein the software containers are based on control plane firmware of the communications devices.

10. The method as claimed in claim 9, wherein memory mappers for the software containers are retrievable from a storage and provisioning system to which a multiplicity of users have at least one of read and write access.

11. The method as claimed in claim 1, further comprising:
recording on the end nodes, during the simulation via the software containers for the communications terminal devices, whether verified reservation enquiries are fulfillable.

12. A simulation system comprising:
a network emulator; and
a configuration generator for a controller of the network emulator;
wherein the simulation system configured to:
functionally divide each communication device of a plurality of communications devices to be simulated based on behavior into a communications control plane comprising a control plane, and into a data transmission plane comprising a data plane, the plurality of communications devices being interconnected within a predefined topology and comprising communications terminal devices on at least one of (i) start nodes and (ii) end nodes of paths for multicast data streams and network infrastructure devices on intermediate nodes;

provide simulation system components which are formed by software containers executable in a sequence control environment for functions of each of the communications devices assigned to the control plane;

model the network infrastructure devices on the data plane by resources provided via each of the network infrastructure devices;

selectively execute the software containers assigned to the communications devices in accordance with the predefined topology in the sequence control environment and couple said executed software containers to one another in the sequence control environment;

execute the software containers for the communications terminal devices on at least one of (i) the start nodes and (ii) the end nodes during the simulation in accordance with specifications relating to a multicast data stream which is at least one of (i) provided and (ii) requested in each case; and verify, via the simulation, whether multicast data streams requested in accordance with reservation enquiries are provided while adhering to the specified quality of service parameters.

13. The simulation system as claimed in claim 12, wherein the simulation system is further configured to at least one of (i) acquire, via a network device discovery, information relating to the communications devices interconnected within the predefined topology and to the predefined topology and (ii) retrieve, via the network device discovery, information relating to the communications devices interconnected within the predefined topology and to the predefined topology from an engineering system.

14. The simulation system as claimed in claim 12, wherein the resources provided by the network infrastructure devices on the data plane comprise at least one of (i) bandwidth, (ii) queue number, (iii) queue cache and (iv) an address cache of the respective network infrastructure device.

15. The simulation system as claimed in claim 13, wherein the resources provided by the network infrastructure devices on the data plane comprise at least one of (i) bandwidth, (ii) queue number, (iii) queue cache and (iv) an address cache of the respective network infrastructure device.

16. The simulation system as claimed in claim 12, wherein the simulation system is further configured to handle the reservation enquiries in accordance with Institute of Electrical and Electronics Engineers (IEEE) 802.1Qcc.

17. The simulation system as claimed in claim 15, wherein the simulation system is further configured to handle the reservation enquiries in accordance with Institute of Electrical and Electronics Engineers (IEEE) 802.1Qcc.

18. The simulation system as claimed in claim 12, wherein the software containers are based on control plane firmware of the communications devices.

19. The simulation system as claimed in claim 18, wherein the simulation system is further configured to retrieve memory mappers for the software containers from a storage and provisioning system to which a multiplicity of users have at least one of (i) read and (ii) write access.

* * * * *